June 25, 1935.　　　M. RESWICK　　　2,006,181
LUBRICATING DEVICE
Filed Sept. 10, 1930
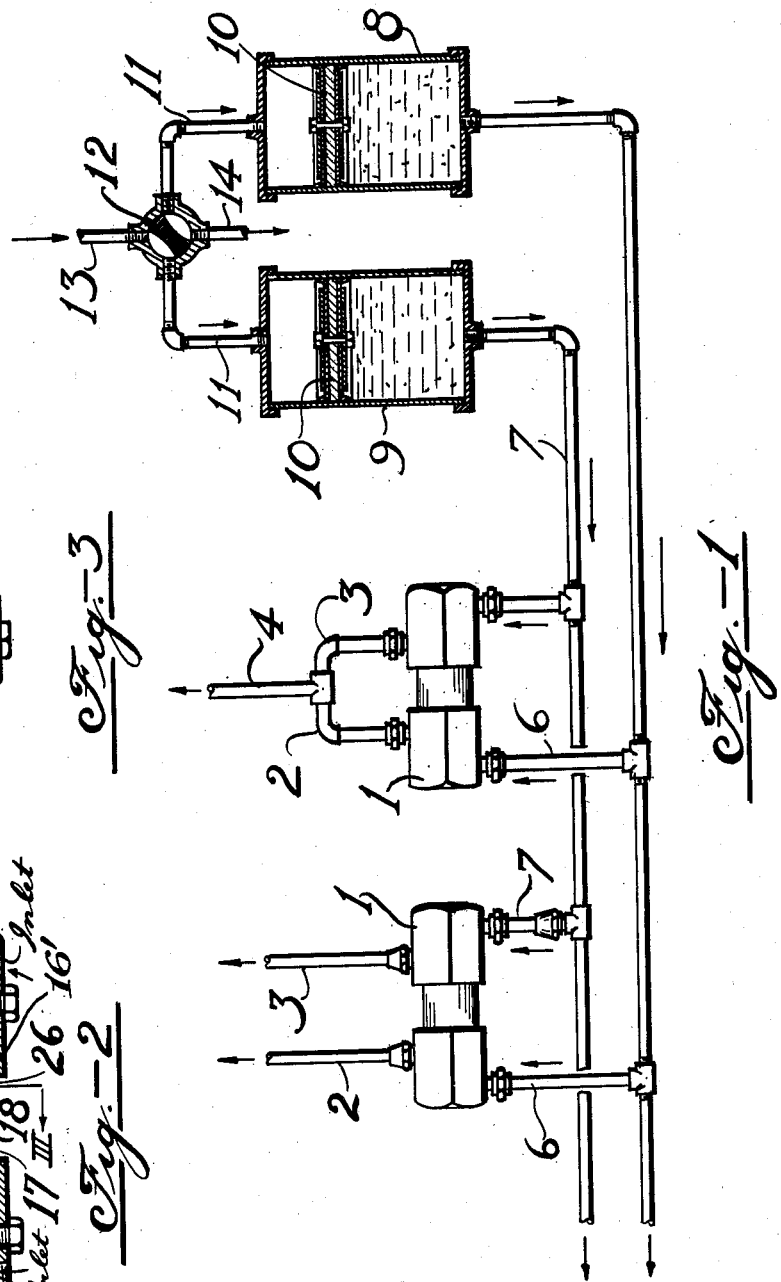
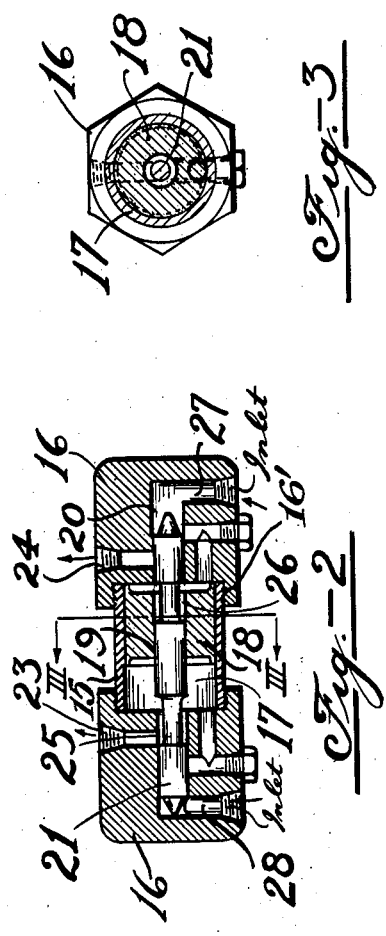
INVENTOR:
Maurice Reswick
BY
W. E. Currie ATTORNEY.

Patented June 25, 1935

2,006,181

UNITED STATES PATENT OFFICE 2,006,181

LUBRICATING DEVICE

Maurice Reswick, Pittsburgh, Pa., assignor to Penola, Inc., a corporation of Delaware Application September 10, 1930, Serial No. 480,883

8 Claims. (Cl. 184—7)

This invention relates to improvements in lubricating devices and will be fully understood from the following description taken in connection with the accompanying drawing, in which latter Fig. 1 is a diagrammatic view, partly in section, of the device;

Fig. 2 is a longitudinal section of the distributor; and

Fig. 3 is a transverse section taken along the line III—III of Fig. 2.

Referring particularly to the drawing, reference numeral 1 designates the distributors through which fluid such as lubricant is passed in a positive manner and in definite and predetermined quantities to discharge lines 2 and 3 which may lead to bearings to be lubricated, not shown. If desired, the lines 2 and 3 may lead into a common line 4 through which the fluid will be discharged to a single bearing. The fluid is introduced into opposite ends of the distributor through lines 6 and 7 which lead from cylinders 8 and 9 respectively. Suitable pistons 10 are disposed in the cylinders. The cylinders are filled with fluid such as grease which is to be forced to the lines 6 and 7 into the distributors by means of the fluid pressure of compressed air, or the like, which is introduced into the cylinders through lines 11. The passage of compressed air into the lines 11 is controlled by a suitable four-way valve 12 of well known construction. Compressed air is introduced into the valve through a line 13. By turning the valve 12 the compressed air can be introduced successively into the lines 11 and at the same time the lines 11 will be successively open to the atmosphere through a line 14. The valve can be operated manually or can be operated automatically by suitable mechanism operatively connected with the mechanism to be lubricated. Lubrication can thus be effected only while the machine is in operation.

Referring particularly to Figs. 2 and 3, the distributor comprises a central body portion 15 which is hollowed to form a container 17 and comprises endwise body portions 16 which are secured to the central body portion 15 by screw threads 16' as can be clearly seen in Fig. 2. A piston 18 reciprocates in the container. The piston and body portion have aligned bores 19 and 20. A valve 21 is movable longitudinally in the bores in reciprocatory motion.

The body portion is provided with outlet ducts 23 and 24 leading from the container on opposite sides of the piston. The outlet ducts comprise passages which open into the bores of the body portion. The valve is provided with spaced ports 25 and 26 each adapted to register with its corresponding outlet upon reciprocation of the valve. The valve thus opens and closes the outlet ducts. The body portion is provided with inlet ducts 27 and 28 opening into the container on opposite sides of the piston. The inlet ducts comprise passages which open into the bores of the body portion and which lead from the bores through the body portion to the container. The openings of the inlet passages in the bores are closed and opened during the reciprocation of the valve.

In operation of the device, lubricant is injected from the cylinders 8 and 9 successively into the inlets 27 and 28. The pressure of the lubricant forces the valve 21 longitudinally to open the inlet passage into the container and to open communication of the container on the opposite side of the piston with the outlet line. The pressure of the lubricant then forces the piston laterally expelling lubricant from the container through the outlet line. At the same time communication of outlet line 24 with the container has been closed by the valve. Pressure is then applied to the lubricant in the cylinder 8 whereby lubricant is injected under pressure through inlet 28 forcing the valve longitudinally to shut off communication of inlet 27 with the container and to open communication of inlet 28 with the container. Simultaneously, an outlet 24 is placed in communication with the container. The lubricant flowing through inlet 28 under pressure forces the piston 18 in reverse movement thereby expelling a measured quantity of the lubricant through outlet 24.

While the invention has been described as applied to the distribution of lubricant, it will be understood that it can be used for the distribution of any other fluid material.

Various changes may be made within the scope of the appended claims, in which it is desired to claim all novelty inherent in the invention as broadly as the prior art permits.

I claim:

1. In apparatus of the class described, a body portion having inlets and outlets, concentric bores in said portion, an annular piston in at least one of said bores, valve heads in said other bores and a stem joining said heads and passing through said annular piston, said body having by-passages associated with said heads, said heads being each arranged to alternatively cover and uncover the outlet passages and the by-passages and said outlet passages being uncovered when their respective by-passages are covered.

2. A fluid distributing device, comprising a body having a central and end portions, a bore running longitudinally in the central portion of said body, concentric bores running longitudinally in the end portions of said body, movable sealing means in said central portion bore, adjacent inlets and outlets on ends of said body portion communicating with said bores, by-passages in said end-portions connecting said inlets with said central portion bore, valve means adapted to cover and uncover said by-passages and outlets, but positioned to longitudinally receive fluid pressure from said inlets, said valve means adapted to control the flow of fluid from the inlets to the outlets.

3. Apparatus for distributing fluid under pressure flowing alternately from a plurality of sources comprising a body having an inlet and an adjacent outlet for each of said sources, and means in said body measuring fluid under pressure then entering at one of said inlets without permitting communication with the outlet adjacent thereto, and simultaneously closing the inlet not then receiving fluid under pressure and utilizing the pressure of said inflowing fluid to force a previously measured quantity of fluid from the outlet adjacent to said last-named inlet, said means being operated to automatically reverse said operations upon alternating the source of fluid under pressure.

4. In apparatus of the class described, a body portion having inlets and outlets, concentric bores in said portion, an annular piston in at least one of said bores, valve heads in said other bores, a stem joining said heads and passing through said annular piston, such body having by-passages associated with said heads, said heads being each arranged to alternatively cover and uncover the outlet passages and the by-passages.

5. In apparatus of the class described, a central body portion, endwise body portions, means for coupling said body portions permitting angular adjustments thereof, said body portions having concentric bores, a floating member in the bore of the central body portion adapted to seal incoming material from outgoing material, inlets and outlets on said endwise portions, by-passages in endwise portions connecting said inlets and central body portion, valve heads in said endwise body portion bores, a stem connecting said heads and passing through said floating member, said heads cooperating to alternately cover and uncover said by-passages and outlets, said floating member cooperating to receive material from a by-passage and eject material from an outlet, fluid under pressure entering one inlet moving said valve heads to open the one by-passage, close the adjacent outlet, open the opposite outlet and close the other by-passage, the fluid entering the bore containing the floating member operating said member to force the fluid through said opposite outlet.

6. In apparatus of the class described, a central body portion, endwise body portions, means for coupling said body portions permitting angular adjustments thereof, said body portions having concentric bores, a floating member in the bore of the central body portion adapted to seal incoming material from outgoing material, inlets and outlets on said endwise portions, by-passages in endwise portions connecting said inlets and central body portion, valve heads in said endwise body portion bores, a stem connecting said heads and passing through said floating member, said heads cooperating to alternately cover and uncover said by-passages and outlets and said floating member transferring pressure from said inlets to said outlets, fluid under pressure entering one inlet moving said valve heads to open the one by-passage, close the adjacent outlet, open the opposite outlet and close the other by-passage, the fluid entering the bore containing the floating member operating said member to force the fluid through said opposite outlet.

7. Apparatus for distributing fluid under pressure flowing alternately from several sources comprising a body having an inlet and an adjacent outlet for fluid corresponding to each fluid source, valve means in said body operated by fluid under pressure at said inlets applied to the heads of the valve, said valve means delivering measured quantities of fluid from an inlet to a position for delivery from the outlet adjacent said inlet, and movable means in said body operated by fluid under pressure entering at an inlet to force said measured quantities of fluid from an outlet not adjacent said last-named inlet.

8. In apparatus of the class described, a body portion having a pair of inlets and an outlet adjacent to each inlet, concentric bores in said portion, an annular piston in one of the said bores, a valve structure comprising valve heads in said other bores and a stem joining said heads passing through said annular piston, said body having by-passages connecting said inlets to the bore containing said annular piston, said heads being arranged to alternately cover and uncover the outlet passages and by-passages, fluid under pressure entering one inlet moving said valve heads to open the one by-passage, close the adjacent outlet, open the opposite outlet and close the other by-passage, the fluid entering the bore containing the floating member, operating said member to force the fluid through said opposite outlet.

MAURICE RESWICK.